(12) United States Patent
Sodagar

(10) Patent No.: US 11,290,514 B2
(45) Date of Patent: Mar. 29, 2022

(54) METHOD FOR CONTENT PREPARATION TEMPLATES FOR 5G COMMON MEDIA APPLICATION FORMAT BASED MEDIA STREAMING

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/211,198

(22) Filed: Mar. 24, 2021

(65) Prior Publication Data

US 2021/0360048 A1 Nov. 18, 2021

Related U.S. Application Data

(60) Provisional application No. 63/026,458, filed on May 18, 2020.

(51) Int. Cl.
| | | |
|---|---|---|
| *H04L 29/06* | (2006.01) | |
| *H04L 29/08* | (2006.01) | |
| *H04L 65/65* | (2022.01) | |
| *H04L 65/60* | (2022.01) | |
| *H04L 67/02* | (2022.01) | |
| *H04L 65/612* | (2022.01) | |

(52) U.S. Cl.
CPC ........ *H04L 65/608* (2013.01); *H04L 65/4084* (2013.01); *H04L 65/607* (2013.01); *H04L 67/02* (2013.01)

(58) Field of Classification Search
CPC . H04L 65/608; H04L 65/4084; H04L 65/607; H04L 67/02
See application file for complete search history.

(56) References Cited

U.S. PATENT DOCUMENTS

| | | |
|---|---|---|
| 8,665,968 B2 | 3/2014 | Chen et al. |
| 2006/0161635 A1 | 7/2006 | Lamkin et al. |
| 2015/0304671 A1 | 10/2015 | Deshpande |
| 2016/0191931 A1 | 6/2016 | Hannuksela |
| 2017/0195670 A1 | 7/2017 | Budagavi |
| 2017/0353718 A1 | 12/2017 | Rodriguez et al. |

(Continued)

OTHER PUBLICATIONS

"3rd Generation Partnership Project; Technical specification Group Services and System Aspects; 5G Media Streaming(5GMS); Protocols (Release 16)", 3GPP TS 26.512 V1.1.0, May 2020, 41pages.

(Continued)

*Primary Examiner* — Jonathan A Bui
(74) *Attorney, Agent, or Firm* — Sughrue Mion, PLLC

(57) ABSTRACT

Systems and methods for media processing and streaming are provided, a method is performed by at least one processor for managing capabilities of a media streaming network. The method includes receiving a content preparation template, wherein the content preparation template includes first information specifying content parameters corresponding to the content, and second information specifying instructions for preparing the content for downlink streaming; preparing the content according to the content preparation template; and streaming the prepared content over the media streaming network to a media streaming client.

20 Claims, 6 Drawing Sheets

(56) References Cited

U.S. PATENT DOCUMENTS

| | | |
|---|---|---|
| 2019/0238909 A1 | 8/2019 | Graham et al. |
| 2019/0238950 A1* | 8/2019 | Stockhammer .. H04N 21/44016 |
| 2020/0045323 A1* | 2/2020 | Hannuksela ....... H04N 21/8543 |
| 2020/0304554 A1* | 9/2020 | Stockhammer ....... H04L 65/601 |
| 2020/0404269 A1 | 12/2020 | Choi et al. |
| 2020/0404361 A1* | 12/2020 | Lohmar ........... H04N 21/44004 |

OTHER PUBLICATIONS

"3rd Generation Partnership projects; Technical Specification Group Services and System Aspects; 5G Media Streaming (5GMS); General description and architecture (Release 16)", 3GPP TS 26.501 V16.3.1, Mar. 2020, 63pages.
International Search Report dated Jul. 16, 2021 in International Application No. PCT/US21/26903.
Written Opinion of the International Searching Authority dated Jul. 16, 2021 in International Application No. PCT/US21/26903.
Written Opinion of the International Searching Authority dated Jul. 16, 2021 in Application No. PCT/US21/26800.
International Search Report dated Jul. 16, 2021 in Application No. PCT/US21/26800.

* cited by examiner

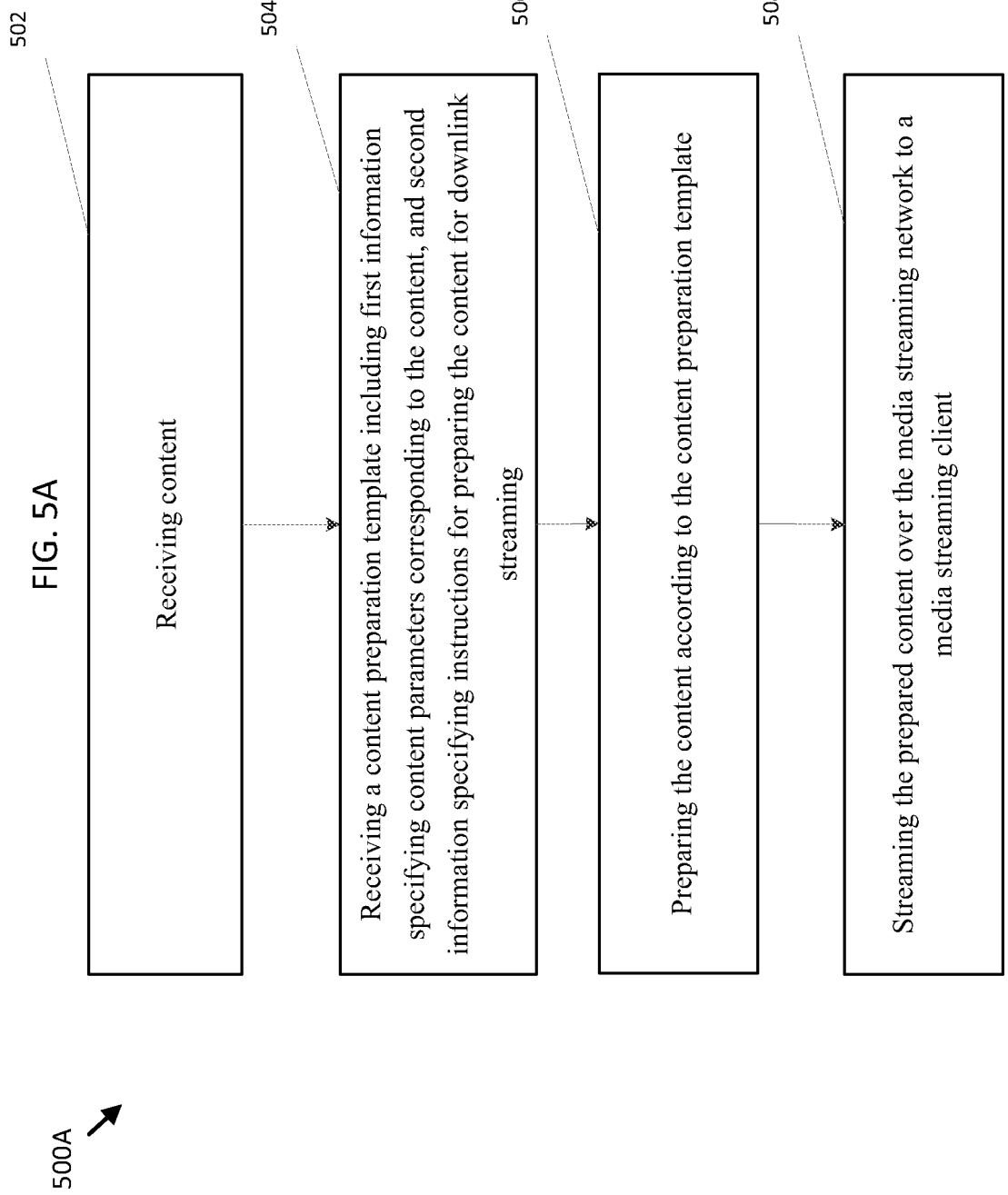

METHOD FOR CONTENT PREPARATION TEMPLATES FOR 5G COMMON MEDIA APPLICATION FORMAT BASED MEDIA STREAMING

CROSS-REFERENCE TO RELATED APPLICATION

This application claims priority from U.S. Provisional Application No. 63/026,458, filed on May 18, 2020, in the United States Patent and Trademark Office, the disclosure of which is incorporated herein by reference in its entirety.

FIELD

Embodiments of this disclosure are directed to media processing and streaming methods and systems, more particularly to preparing content based on content preparation templates.

BACKGROUND

3rd Generation Partnership Project (3GPP) TS26.512 defines the concept of content preparation template to set up the processing of the media streams before hosting the content for streaming. However, the characteristics of the content preparation template are not defined.

SUMMARY

According to one or more embodiments, a method of content preparation for a media streaming network using at least one processor includes receiving content; receiving a content preparation template, wherein the content preparation template includes first information specifying content parameters corresponding to the content, and second information specifying instructions for preparing the content for downlink streaming; preparing the content according to the content preparation template; and streaming the prepared content over the media streaming network to a media streaming client.

According to one or more embodiments, a device for content preparation for a media streaming network includes at least one memory configured to store program code; and at least one processor configured to read the program code and operate as instructed by the program code, the program code including: first receiving code configured to cause the at least one processor to receive content; second receiving code configured to cause the at least one processor to receive a content preparation template, wherein the content preparation template includes first information specifying content parameters corresponding to the content, and second information specifying instructions for preparing the content for downlink streaming; preparing code configured to cause the at least one processor to prepare the content according to the content preparation template; and streaming code configured to cause the at least one processor to stream the prepared content over the media streaming network to a media streaming client.

According to one or more embodiments, a non-transitory computer-readable medium stores instructions, the instructions including: one or more instructions that, when executed by one or more processors of a device for content preparation for a media streaming network, cause the one or more processors to: receive content; receive a content preparation template, wherein the content preparation template includes first information specifying content parameters corresponding to the content, and second information specifying instructions for preparing the content for downlink streaming; prepare the content according to the content preparation template; and stream the prepared content over the media streaming network to a media streaming client.

BRIEF DESCRIPTION OF THE DRAWINGS

Further features, the nature, and various advantages of the disclosed subject matter will be more apparent from the following detailed description and the accompanying drawings in which:

FIGS. 5A-5B are a flowcharts of example processes for content preparation for a media streaming network, according to embodiments.

DETAILED DESCRIPTION

Figure 1:
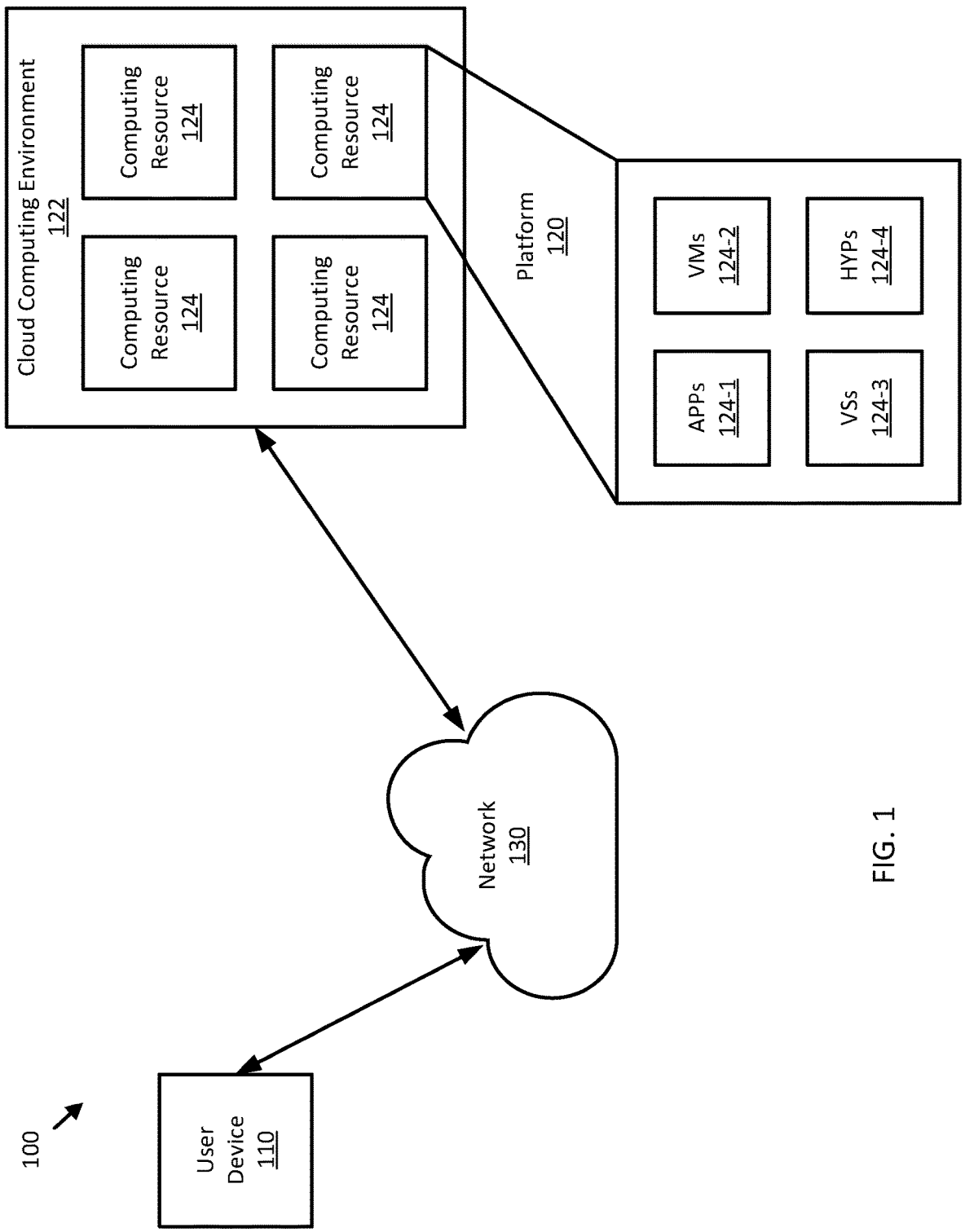
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
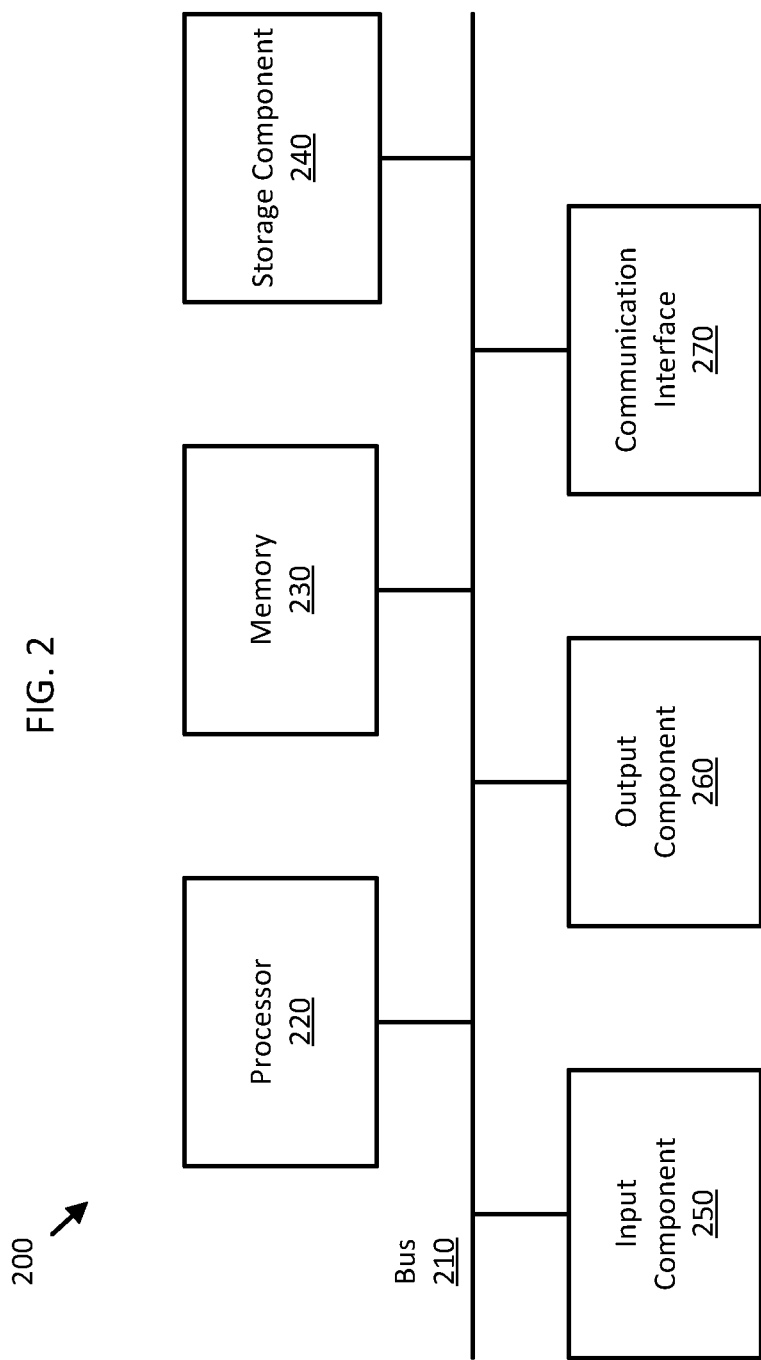
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

The 5G media streaming architecture defined in 3GPP TS26.501 only defines a general architecture for uplink and downlink media streaming. It does not address the discovery of application servers and their capabilities for media processing. In addition, 3GPP TS26.512 defines the concept of content preparation template to prepare received content for downlink streaming, but does not define how the content template works. A 5G media-streaming architecture for downlink and uplink streaming is shown in FIGS. 3 and 4.

Figure 3:
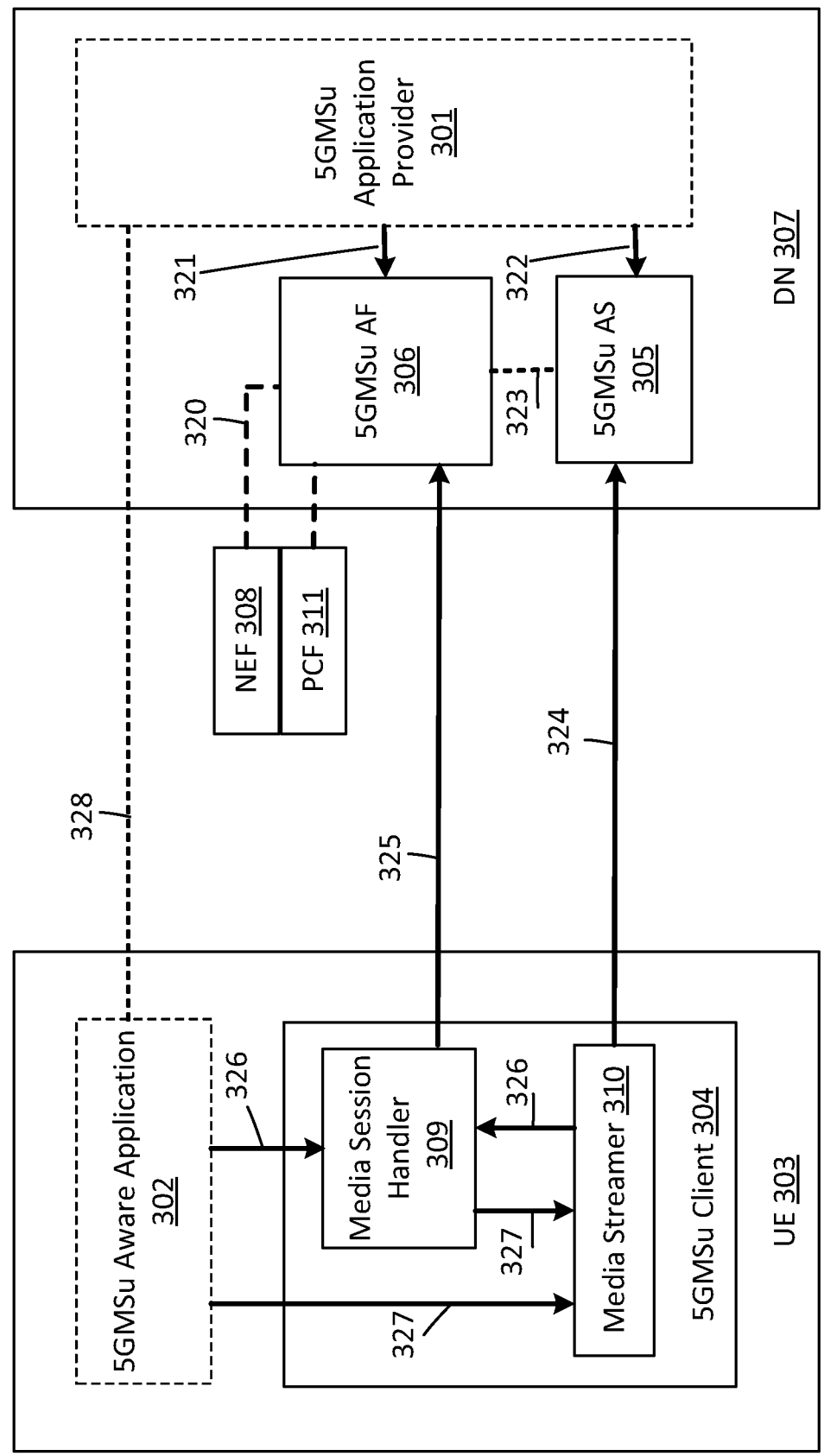
FIG. 3 is a block diagram of a media architecture for media uplink streaming, according to embodiments.
Figure 4:
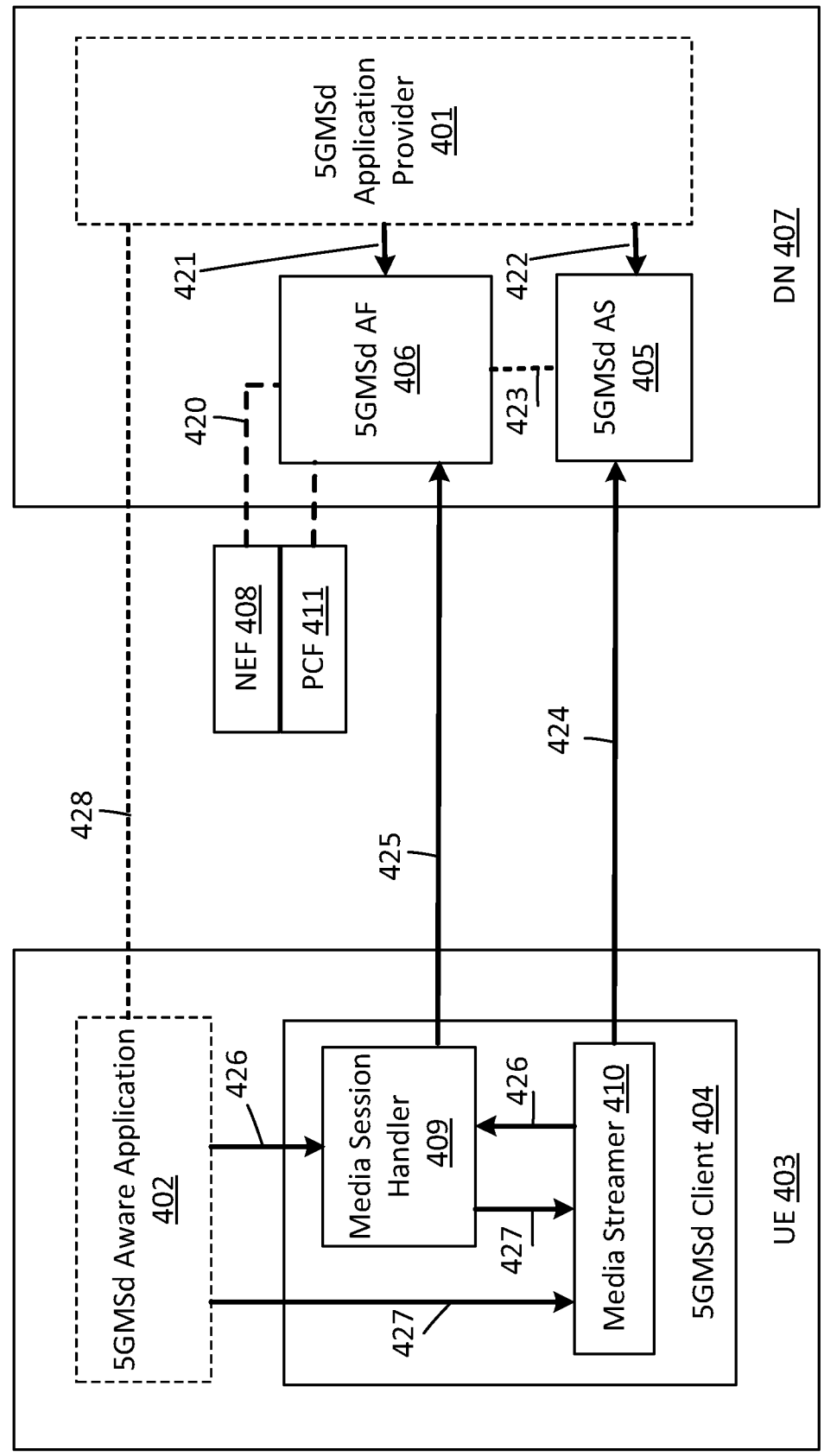
FIG. 4 is a block diagram of a media architecture 400 for media uplink streaming, according to embodiments.

FIG. 3 is a diagram of a media architecture 300 for media uplink streaming. A 5G media streaming uplink (5GMSu) Application Provider 301 may use 5GMSu for uplink streaming services. 5GMSu Application provider 301 may provide a 5GMSu Aware Application 302 on the UE 303 to make use of 5GMSu Client 304 and network functions using interfaces and APIs defined in 5GMSu. 5GMSu Application Server (AS) may be an AS dedicated to 5G Media Uplink Streaming. 5GMSu Client 304 may be a UE 303 internal function dedicated to 5G Media Uplink Streaming.

5GMSu Application Function (AF) 306 and 5GMSu AS 305 may be Data Network (DN) 307 functions. Functions in trusted DNs may be trusted by the operator's network. Therefore, AFs in trusted DNs may directly communicate with all 5G Core functions. Functions in external DNs may only communicate with 5G Core functions via the Network Exposure Function (NEF) 308 using link 320.

The media architecture 300 may connect UE 303 internal functions and related network functions for 5G Media Uplink Streaming. Accordingly, media architecture 300 may include a number of functions. For example, 5GMSu Client 304 on UE 303 may be an originator of 5GMSu service that may be accessed through interfaces/APIs. 5GMSu Client 304 may include two sub-functions, media session handler 309 and media streamer 310. Media session handler 309 may communicate with the 5GMSu AF 306 in order to establish, control and support the delivery of a media session. The Media Session Handler 309 may expose APIs that can be used by the 5GMSu Aware Application 302. Media Streamer 310 may communicate with 5GMSu AS 305 in order to stream the media content and provide a service to the 5GMSu Aware Application 302 for media capturing and streaming, and the Media Session Handler 309 for media session control. 5GMSu Aware Application 302 may control 5GMSu Client 303 by implementing external application or content service provider specific logic and enabling the establishment of a media session. 5GMSu AS 305 may host 5G media functions. 5GMSu Application Provide 301 may be an external application or content specific media functionality, e.g., media storage, consumption, transcoding and redistribution that uses 5GMSu to stream media from 5GMSu Aware Application 302. 5GMSu AF 306 may provide various control functions to the Media Session Handler 309 on the UE 303 and/or to 5GMSu Application Provider 301. 5GMSu AF 306 may relay or initiate a request for different Policy or Charging Function (PCF) 311 treatment or interact with other network functions.

Media architecture 300 may include a number of different interface. For example, link 321 may relate to M1u, which may be a 5GMSu Provisioning API exposed by 5GMSu AF 306 to provision usage of media architecture 300 and to obtain feedback. Link 322 may relate to M2u, which may be a 5GMSu Publish API exposed by 5GMSu AS 305 and used when 5GMSu AS 305 in trusted DN, such as DN 307, is selected to receive content for streaming service. Link 323 may relate to M3u, which may be an internal API used to exchange information for content hosting on 5GMSu AS 305 within a trusted DN such as DN 307. Link 324 may relate to M4u, which may be a Media Uplink Streaming API exposed by 5GMSu AS 323 to Media Streamer 310 to stream media content. Link 325 may relate to M5u, which may be a Media Session Handling API exposed by 5GMSu AF 305 to Media Session Handler for media session handling, control and assistance that also include appropriate security mechanisms e.g. authorization and authentication. Link 326 may relate to M6u, which may be a UE 303 Media Session Handling API exposed by Media Session Handler 309 to 5GMSu Aware Application 302 to make use of 5GMSu functions. Link 327 may relate to M7u, which may be a UE Media Streamer API exposed by Media Streamer 310 to 5GMSu Aware Application 302 and Media Session Handler 309 to make use of Media Streamer 310. Link 328 may relate to M8u, which may be an Application API which is used for information exchange between 5GMSu Aware Application 302 and 5GMSu Application Provider 301, for example to provide service access information to the 5GMSu Aware Application 302.

FIG. 4 is a diagram of a media architecture 400 for media downlink streaming. A 5G media streaming downlink (5GMSd) Application Provider 401 may use 5GMSd for downlink streaming services. 5GMSd Application provider 401 may provide a 5GMSd Aware Application 402 on the UE 403 to make use of 5GMSd Client 404 and network functions using interfaces and APIs defined in 5GMSd. 5GMSd Application Server (AS) may be an AS dedicated to 5G Media Downlink Streaming. 5GMSd Client 404 may be a UE 403 internal function dedicated to 5G Media Downlink Streaming.

5GMSd Application Function (AF) 406 and 5GMSd AS 405 may be Data Network (DN) 407 functions. Functions in trusted DNs may be trusted by the operator's network. Therefore, AFs in trusted DNs may directly communicate with all 5G Core functions. Functions in external DNs may only communicate with 5G Core functions via the Network Exposure Function (NEF) 408 using link 420.

The media architecture 400 may connect UE 403 internal functions and related network functions for 5G Media Downlink Streaming. Accordingly, media architecture 400 may include a number of functions. For example, 5GMSd Client 404 on UE 403 may be a receiver of 5GMSd service that may be accessed through interfaces/APIs. 5GMSd Client 404 may include two sub-functions, media session handler 409 and media Player 410. Media session handler 409 may communicate with the 5GMSd AF 406 in order to establish, control and support the delivery of a media session. The Media Session Handler 409 may expose APIs that can be used by the 5GMSd Aware Application 402. Media Player 410 may communicate with 5GMSd AS 405 in order to stream the media content and provide a service to the 5GMSd Aware Application 402 for media playback, and the Media Session Handler 409 for media session control. 5GMSd Aware Application 402 may control 5GMSd Client 403 by implementing external application or content service provider specific logic and enabling the establishment of a media session. 5GMSd AS 405 may host 5G media functions. 5GMSd Application Provide 401 may be an external application or content specific media functionality, e.g., media creation, encoding, and formatting that uses 5GMSd to stream media to 5GMSd Aware Application 402. 5GMSd AF 406 may provide various control functions to the Media Session Handler 409 on the UE 403 and/or to 5GMSd Application Provider 401. 5GMSd AF 406 may relay or initiate a request for different Policy or Charging Function (PCF) 411 treatment or interact with other network functions.

Media architecture 400 may include a number of different interfaces. For example, link 421 may relate to M1d, which may be a 5GMSd Provisioning API exposed by 5GMSd AF 406 to provision usage of media architecture 400 and to obtain feedback. Link 422 may relate to M2d, which may be a 5GMSd Ingest API exposed by 5GMSd AS 405 and used when 5GMSd AS 405 in trusted DN, such as DN 407, is selected to receive content for streaming service. Link 423 may relate to M3d, which may be an internal API used to exchange information for content hosting on 5GMSd AS 405 within a trusted DN such as DN 407. Link 424 may relate to M4d, which may be a Media Downlink Streaming API exposed by 5GMSd AS 423 to Media Player 410 to stream media content. Link 425 may relate to M5d, which may be a Media Session Handling API exposed by 5GMSd AF 405 to Media Session Handler for media session handling, control and assistance that also include appropriate security mechanisms e.g. authorization and authentication. Link 426 may relate to M6d, which may be a UE 403 Media Session Handling API exposed by Media Session Handler 409 to 5GMSd Aware Application 402 to make use of 5GMSd functions. Link 427 may relate to M7d, which may be a UE Media Player API exposed by Media Player 410 to 5GMSd Aware Application 402 and Media Session Handler 409 to make use of Media Player 410. Link 428 may relate to M8d, which may be an Application API which is used for information exchange between 5GMSd Aware Application 402 and 5GMSd Application Provider 401, for example to provide service access information to the 5GMSd Aware Application 402.

As discussed above, 3GPP TS26.512 defines the concept of content preparation template to prepare received content for downlink streaming, but does not define how the content template works.

The received content from uplink usually includes a single common media application format (CMAF) stream for each media type. Therefore, a media stream may include a video CMAF stream, and audio CMAFstream. In embodiments, the received content may also include, for example, a timed text CMAF stream.

Received media streams must be prepared for 5G downlink streaming. An example of such preparation includes:

1. Each video stream is converted to one or more CMAF switching sets
   a. Each switching set has a specific codec, profile, and level.
   b. Each switching set has one or more representations with a specific width, height, bandwidth.
2. Each audio stream is converted to one or more CMAF switching sets
   a. Each switching set has a specific codec, profile, and level.
   b. Each switching set has one or more representations with specific sampling rate, channel configuration, and other audio parameters.
3. Each subtitle stream is converted to one or more CMAF switching sets
   a. Each switching set has a specific subtitle format and profile, and one representation.
4. One or more Manifests are generated to describe the streaming content:
   a. Each manifest has a specific format (e.g. MPD, m3u8) including:
      i. General manifest information,
      ii. BaseURLs for the location of media segments
      iii. Segment addressing scheme for each adaptation set, or media stream
      iv. General descriptors such as rating, accessibility, channel configuration, and others for each adaptation set or representation
      v. Content protection information for each adaptation set In order to assist in preparation of content as described above, a content preparation template may include the following information:

1. An object containing CMAF ingest information for each media stream, including:
   a. MIME Type
   b. Codec parameters
   c. Bitrate
   d. timescale
   e. Nominal segment duration
   f. Maximum segment duration g. Width and height for video content
h. The sampling rate for audio content
i. Audio channel configuration for audio content
2. An array of objects, where each object has information for one downlink CMAF switching sets, including:
   a. MIME type
   b. Codec parameter
   c. Nominal Segment duration
   d. Number of representations
   e. For each representation
      i. Codec parameters
      ii. Bitrate
      iii. Timescale
      iv. Nominal segment duration
      v. Maximum segment duration
      vi. File name template
      vii. Width and height for video content
      viii. Sampling rate for audio content
      ix. Audio channel configuration for audio content
      x. Common encryption information applied for representation
3. An array of objects, where each object has information for one manifest, including:
   a. Manifest format (DASH MPD, HLS m3u8, etc)
   b. Segment addressing scheme
   c. BaseURL
   d. Content protection information or URLs to request Content protection information
   e. Annotation information, or URLs to retrieve access annotation information In embodiments, a content preparation template object may be implemented as a JavaScript Object Notation (JSON) object with one or more of the items shown in Tables 1-5:

TABLE 1

Content Preparation Template

| Parameter Name | Type | Cardinality |
| --- | --- | --- |
| id | P | 1 |
| name | P | 1 |
| description | P | 1 |
| in-cmaf-stream | Array of object | 1 |
| out-cmaf-switching-set | Array of object | 1 |
| manifest | Array of object | 1 |

TABLE 2 in-cmaf-stream object

| Parameter Name | Type | Cardinality |
| --- | --- | --- |
| stream-id | parameter | 1 |
| name | parameter | 1 |
| description | parameter | 1 |
| directory location | parameter | 1 |
| file-template | parameter | 1 |
| mime-type | parameter | 1 |
| codec parameters | parameter | 1 |
| bitrate | parameter | 1 |
| timescale | parameter | 1 |
| nominal-segment-duration | parameter | 1 |
| maximum-segment-duration | parameter | 1 |
| audio-parameters | object | 0-1 |
| video-parameters | object | 0-1 |
| subtitle-parameters | object | 0-1 |

TABLE 3 out-cmaf-stream object

| Parameter Name | Type | Cardinality |
| --- | --- | --- |
| stream-id | parameter | 1 |
| name | parameter | 1 |
| description | parameter | 1 |
| directory-location | parameter | 1 |
| file-template | parameter | 1 |
| mime-type | parameter | 1 |
| codec-parameters | parameter | 1 |
| max-bitrate | parameter | 1 |
| timescale | parameter | 0-1 |
| nominal-segment-duration | parameter | 0-1 |
| maximum-segment-duration | parameter | 0-1 |
| Common-encryption | object | 0-1 |
| Segment-addressing | object | 0-1 |
| baseurl | object | 0-1 |
| content-protection | Array of object | 0-1 |
| annotation | Array of object | 0-1 |
| representation | Array of object | 1 |

TABLE 4 representation object

| Parameter Name | Type | Cardinality |
| --- | --- | --- |
| stream-id | parameter | 1 |
| name | parameter | 1 |
| description | parameter | 1 |
| directory-location | parameter | 1 |
| file-template | parameter | 1 |
| mime-Type | parameter | 1 |
| codec-parameters | parameter | 1 |
| bitrate | parameter | 1 |
| timescale | parameter | 1 |
| nominal-segment-duration | parameter | 1 |
| maximum-segment-duration | parameter | 1 |
| audio-parameters | object | 0-1 |
| video-parameters | object | 0-1 |
| subtitle-parameters | object | 0-1 |
| common-encryption | object | 0-1 |
| segment-addressing | object | 0-1 |
| baseurl | object | 0-1 |
| content-protection | Array of object | 0-1 |
| annotation | Array of object | 0-1 |

TABLE 5 manifest object

| Parameter Name | Type | Cardinality |
| --- | --- | --- |
| id | parameter | 1 |
| name | parameter | 1 |
| description | parameter | 1 |
| directory-location | parameter | 1 |
| filename | parameter | 1 |
| MIME Type | parameter | 1 |
| segment-addressing | Array of object | 1 |
| baseurl | Array of object | 1 |
| content-protection | Array of object | 1 |
| annotation | Array of object | 1 |

In embodiments, an Application Function (AF) may launch one or more transcoding sessions based on the content preparation template using the following process:
1. Receives the workflow creation request
2. Defines a workflow that consists of inputs for each media stream and output for each CMAF representation.
3. Instantiate tasks in the workflow for each decoding and encoding, and/or transcoding task 4. Instantiate manifest packager task(s) which create manifest(s) for each listed manifest format in content preparation template
5. Send the workflow creation response by updating the template resource to the actual values Accordingly, embodiments may relate to methods for content preparation templating for CMAF ingest and CMAF based streaming, wherein the input and output characteristics are described in a content preparation template, wherein the content preparation template describes the characteristics of inputs and the overall workflow process that must be applied to the input, wherein the manifest formats and their characteristics are also described in the content preparation template, wherein annotation and content protection schemes are described as well as the segment addressing schemes that must be used for each representation in the manifest.

Further, embodiments may relate to a process of establishing media workflow based on the content preparation templates described herein, and acknowledging the creation of the workflow by providing the updated template to the requesting network entity.

Figure 5B:
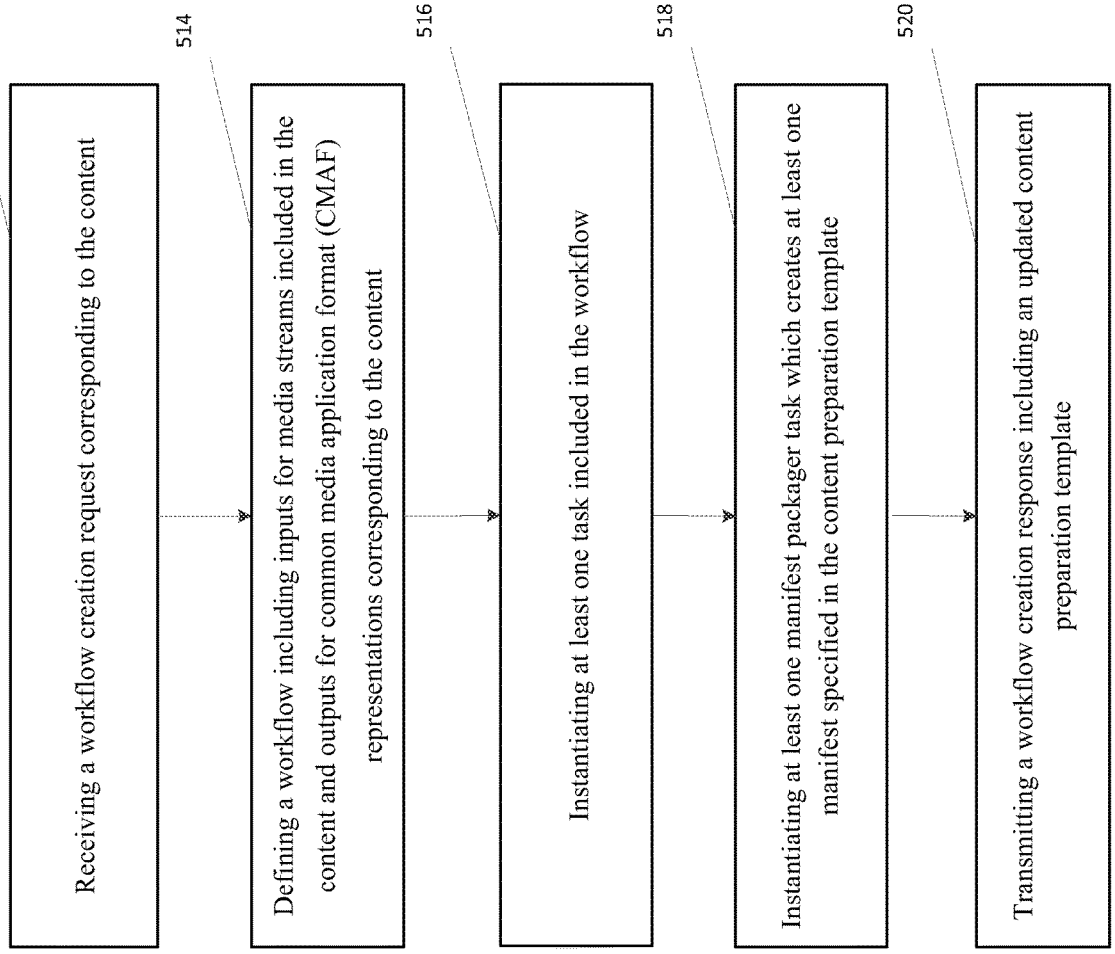

FIGS. 5A-5B are a flowchart of example processes 500A and 500B of content preparation for a media streaming network. In some implementations, one or more process blocks of FIGS. 5A-5B may be performed by media AF 502. In some implementations, one or more process blocks of FIGS. 5A-5B may be performed by another device or a group of devices separate from or including media AF 502, such as 5GMSu AF 306, 5GMSd AF 406, or other elements of DN 307 and DN 407.

As shown in FIG. 5A, process 500A may include receiving content (block 502).

As further shown in FIG. 5A, process 500A may include receiving a content preparation template, wherein the content preparation template includes first information specifying content parameters corresponding to the content, and second information specifying instructions for preparing the content for downlink streaming (block 504).

As further shown in FIG. 5A, process 500A may include preparing the content according to the content preparation template (block 506).

As further shown in FIG. 5A, process 500A may include streaming the prepared content over the media streaming network to a media streaming client (block 508).

As shown in FIG. 5B, process 500B may include receiving a workflow creation request corresponding to the content (block 512).

As further shown in FIG. 5B, process 500B may include defining a workflow including inputs for media streams included in the content and outputs for common media application format (CMAF) representations corresponding to the content (block 514).

As further shown in FIG. 5B, process 500B may include instantiating at least one included in the workflow (block 516).

As further shown in FIG. 5B, process 500B may include instantiating at least one manifest packager task which creates at least one manifest specified in the content preparation template (block 518).

As further shown in FIG. 5B, process 500B may include transmitting a workflow creation response including an updated content preparation template (block 520).

In embodiments, one or more blocks of process 500B may be included in one or more blocks of process 500A, for example in block 506. In embodiments, one or more blocks of process 500B may be performed before or after one or more blocks of 500A.

In embodiments, the content and the content preparation template may be received by an application function from an application service provider.

In embodiments, the content may be received by an application function from an application service provider, and the content preparation template may be received by the application function from the media streaming client.

In embodiments, the content includes a common media application format (CMAF) video stream and a CMAF audio stream.

In embodiments, the first information includes CMAF ingest information including at least one from among: a multipurpose internet mail extensions (MIME) type corresponding to the content, codec parameters corresponding to the content, a bitrate corresponding to the content, a timescale corresponding to the content, a nominal segment duration corresponding to the content, a width of video content corresponding to the content, a height of the video content corresponding to the content, a sampling rate for audio content corresponding to the content, and audio channel configuration information for the audio content corresponding to the content.

In embodiments, the second information includes instructions for converting a media stream of the content into one or more CMAF switching sets, and instructions for generating one or more manifests corresponding to the content.

In embodiments, the second information includes at least one from among: one or more MIME types corresponding to the one or more CMAF switching sets, one or more codec parameters of the one or more CMAF switching sets, one or more nominal segment durations of the one or more CMAF switching sets, and information about one or more representations of the one or more CMAF switching sets.

In embodiments, the second information includes at least one from among: one or more manifest formats of the one or more manifests, one or more segment addressing schemes of the one or more manifests, content protection information of the one or more manifests, and annotation information of the one or more manifests.

In embodiments, the content preparation template includes a JavaScript Object Notation (JSON) object.

Although FIGS. 5A-5B show example blocks of processes 500A and 500B, in some implementations, processes 500A and 500B may include additional blocks, fewer blocks, different blocks, or differently arranged blocks than those depicted in FIGS. 5A-5B. Additionally, or alternatively, two or more of the blocks of processes 500A and 500B may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of content preparation for a media streaming network performed by at least one processor, the method comprising:
   receiving content;
   receiving a content preparation template, wherein the content preparation template includes first information including common media application format (CMAF) ingest information specifying content parameters corresponding to the content, and second information specifying instructions for preparing the content for downlink streaming by converting a media stream of the content into one or more CMAF switching sets;
   preparing the content according to the content preparation template by receiving a workflow creation request corresponding to the content and defining a workflow including inputs for media streams included in the content and outputs for CMAF representations corresponding to the content, and transmitting a workflow creation response including an updated version of the content preparation template; and
   streaming the prepared content over the media streaming network to a media streaming client.

2. The method of claim 1, wherein the preparing of the content further comprises:
   instantiating at least one task included in the workflow; and
   instantiating at least one manifest packager task which creates at least one manifest specified in the content preparation template.

3. The method of claim 1, wherein the content and the content preparation template are received by an application function from an application service provider.

4. The method of claim 1, wherein the content is received by an application function from an application service provider, and
   wherein the content preparation template is received by the application function from the media streaming client.

5. The method of claim 1, wherein the content comprises a CMAF video stream and a CMAF audio stream.

6. The method of claim 1, wherein the first information includes at least one from among:
   a multipurpose internet mail extensions (MIME) type corresponding to the content,
   codec parameters corresponding to the content,
   a bitrate corresponding to the content,
   a timescale corresponding to the content,
   a nominal segment duration corresponding to the content,
   a width of video content corresponding to the content,
   a height of the video content corresponding to the content,
   a sampling rate for audio content corresponding to the content, or
   audio channel configuration information for the audio content corresponding to the content.

7. The method of claim 1, wherein the second information includes instructions for generating one or more manifests corresponding to the content.

8. The method of claim 1, wherein the second information includes at least one from among:
   one or more multipurpose internet mail extensions (MIME) types corresponding to the one or more CMAF switching sets,
   one or more codec parameters of the one or more CMAF switching sets,
   one or more nominal segment durations of the one or more CMAF switching sets, or
   information about one or more representations of the one or more CMAF switching sets.

9. The method of claim 7, wherein the second information includes at least one from among:
   one or more manifest formats of the one or more manifests,
   one or more segment addressing schemes of the one or more manifests,
   content protection information of the one or more manifests, or
   annotation information of the one or more manifests.

10. The method of claim 1, wherein the content preparation template comprises a JavaScript Object Notation (JSON) object.

11. A device for content preparation for a media streaming network, the device comprising:
    at least one memory configured to store program code; and
    at least one processor configured to read the program code and operate as instructed by the program code, the program code including:
    first receiving code configured to cause the at least one processor to receive content;
    second receiving code configured to cause the at least one processor to receive a content preparation template, wherein the content preparation template includes first information including common media application format (CMAF) ingest information specifying content parameters corresponding to the content, and second information specifying instructions for preparing the content for downlink streaming by converting a media stream of the content into one or more CMAF switching sets;

preparing code configured to cause the at least one processor to prepare the content according to the content preparation template by receiving a workflow creation request corresponding to the content and defining a workflow including inputs for media streams included in the content and outputs for CMAF representations corresponding to the content, and transmitting a workflow creation response including an updated version of the content preparation template; and streaming code configured to cause the at least one processor to stream the prepared content over the media streaming network to a media streaming client.

12. The device of claim 11, wherein the preparing code further comprises:
first instantiating code configured to cause the at least one processor to instantiate at least one task included in the workflow;
second instantiating code configured to cause the at least one processor to instantiate at least one manifest packager task which creates at least one manifest specified in the content preparation template.

13. The device of claim 11, wherein the content and content preparation template are received by an application function from an application service provider.

14. The device of claim 11, wherein the content is received by an application function from an application service provider, and
wherein the content preparation template is received by the application function from the media streaming client.

15. The device of claim 11, wherein the content comprises a CMAF video stream and a CMAF audio stream.

16. The device of claim 11, wherein the first information comprises at least one from among:
a multipurpose internet mail extensions (MIME) type corresponding to the content,
codec parameters corresponding to the content,
a bitrate corresponding to the content,
a timescale corresponding to the content,
a nominal segment duration corresponding to the content,
a width of video content corresponding to the content,
a height of the video content corresponding to the content,
a sampling rate for audio content corresponding to the content, or
audio channel configuration information for the audio content corresponding to the content.

17. The device of claim 11, wherein the second information comprises instructions for generating one or more manifests corresponding to the content.

18. The device of claim 17, wherein the second information includes at least one from among:
one or more multipurpose internet mail extensions (MIME) types corresponding to the one or more CMAF switching sets,
one or more codec parameters of the one or more CMAF switching sets,
one or more nominal segment durations of the one or more CMAF switching sets, or
information about one or more representations of the one or more CMAF switching sets.

19. The device of claim 17, wherein the second information includes at least one from among:
one or more manifest formats of the one or more manifests,
one or more segment addressing schemes of the one or more manifests,
content protection information of the one or more manifests, or
annotation information of the one or more manifests.

20. A non-transitory computer-readable medium storing instructions, the instructions comprising: one or more instructions that, when executed by one or more processors of a device for content preparation for a media streaming network, cause the one or more processors to:
receive content;
receive a content preparation template, wherein the content preparation template includes first information including common media application format (CMAF) ingest information specifying content parameters corresponding to the content, and second information specifying instructions for preparing the content for downlink streaming by converting a media stream of the content into one or more CMAF switching sets;
prepare the content according to the content preparation template by receiving a workflow creation request corresponding to the content and defining a workflow including inputs for media streams included in the content and outputs for CMAF representations corresponding to the content, and transmitting a workflow creation response including an updated version of the content preparation template; and
stream the prepared content over the media streaming network to a media streaming client.

* * * * *